United States Patent
Ashourian et al.

(10) Patent No.: US 7,247,333 B2
(45) Date of Patent: *Jul. 24, 2007

(54) STABILIZED MILK PRODUCT CONTAINING FRUIT AND FRUIT JUICE

(75) Inventors: Jamshid Ashourian, Deerfield, IL (US); Lauri J. Keeler, Lincoln, NE (US); Durward A. Smith, Lincoln, NE (US)

(73) Assignee: Pepsico Inc., Purchase, NY (US)

( * ) Notice: Subject to any disclaimer, the term of this patent is extended or adjusted under 35 U.S.C. 154(b) by 576 days.

This patent is subject to a terminal disclaimer.

(21) Appl. No.: 10/392,171

(22) Filed: Mar. 19, 2003

(65) Prior Publication Data

US 2004/0185161 A1    Sep. 23, 2004

(51) Int. Cl.
*A23C 23/00* (2006.01)

(52) U.S. Cl. ...................... 426/580; 426/519; 426/573; 426/577; 426/583; 426/584; 426/588; 426/590; 426/599

(58) Field of Classification Search ................ 426/519, 426/573, 577, 580, 583, 584, 588, 590, 599
See application file for complete search history.

(56) References Cited

U.S. PATENT DOCUMENTS

| | | | |
|---|---|---|---|
| 3,625,702 A | 12/1971 | Exler | 99/59 |
| 3,764,710 A | 10/1973 | Inagami et al. | 426/185 |
| 4,061,792 A | 12/1977 | Inagami et al. | 426/330.2 |
| 4,078,092 A | 3/1978 | Nishiyama | 426/584 |
| 4,212,893 A | 7/1980 | Takahata | 426/330.2 |
| 4,676,988 A | 6/1987 | Efstathiou et al. | 426/271 |
| 5,202,145 A | 4/1993 | Wisler et al. | 426/580 |
| 5,648,112 A | 7/1997 | Yang et al. | 426/580 |
| 5,849,350 A | 12/1998 | Ashourian | 426/615 |
| 5,879,737 A | 3/1999 | Ashourian | 426/615 |
| 6,171,633 B1 | 1/2001 | Dulebohn et al. | 426/580 |

OTHER PUBLICATIONS

Wong et al., Fundamentals of Dairy Chemistry, Third Edition, 1988, Van Nostrand Reinhold Company, New York, p. 21.*

* cited by examiner

*Primary Examiner*—Leslie Wong
(74) *Attorney, Agent, or Firm*—Banner & Witcoff, Ltd.

(57) ABSTRACT

A milk product containing milk, pectin and a fruit ingredient is disclosed, which uses a significant percentage of real milk and which reduces the chalky-taste of prior art fruit-flavored milk products. A process for making such a milk product is also disclosed, wherein milk and pectin are pre-mixed and homogenized prior to blending in the fruit ingredient. The resulting blend is further homogenized. The product disclosed herein may contain other ingredients. The preferred stabilized milk product includes from about 0.25 to about 8.0% of milk protein including solid milk proteins; from about 5 to about 40% of fruit ingredients including solid fruit particles; from about 0.1 to about 2.5% of cations; from about 0.01 to about 5.0% of a stabilizer, preferably pectin; and water; wherein the stabilized milk product is an aqueous fluid having a pH in the range of from 3.2 to about 4.6, and wherein the average particle size of the solid milk protein particles ranges from about 1.38 to about 11.0 micrometers and the average particle size of the solid fruit particles ranges from about 88 to about 249 micrometers.

2 Claims, 5 Drawing Sheets

STABILIZED MILK PRODUCT CONTAINING FRUIT AND FRUIT JUICE

CROSS REFERENCE TO RELATED APPLICATIONS

The present application is related to and claims priority to PCT Application No. PCT/US02/01904 entitled STABILIZED MILK PRODUCT CONTAINING FRUIT AND FRUIT JUICE, filed Jan. 23, 2002, which claims priority to U.S. patent application Ser. No. 60/263,863 for MILK PRODUCT AND METHOD OF MANUFACTURE filed Jan. 23, 2001.

FIELD OF THE INVENTION

The present invention relates to stabilized food products including milk, fruit, fruit juice and other all-natural ingredients. The preferred stabilized milk and fruit products contain a natural stabilizer, preferably pectin. Although substitutes for each of the natural ingredients of the present invention fall within the broad scope of the claims hereto, all of the preferred embodiments are free of non-natural ingredients as a matter of choice. The present invention also relates to methods of making the present stabilized milk and fruit products.

BACKGROUND OF THE INVENTION

There is considerable interest in the food industry in combining milk and fruit juice to form stable, healthful beverage products that have a desirable taste and mouthfeel. Milk is well known as a healthful source of protein and calcium and fruit and fruit juice generally provide a wonderful combination of vitamins and other healthy nutrients, which well educated consumers prefer over other less healthful products. The difficulty in providing a healthful product containing milk and fruit or fruit juice has generally been the lack of stability in such products. There are several stability problems to overcome. Microbial stability is the first problem people generally consider in regard to food products. In the case of the present products, microbial stability, which can be a significant problem in products having a higher pH, is generally a lesser concern, because the preferred products generally have a relatively low pH. Stability with respect to the coagulation of milk and other proteins, however, is a significant concern in products having a lower pH. This is especially a concern when the product has a pH below the isoelectric point of any such proteins, where it is generally believed that the proteins will precipitate to form a curd. In addition, even if a curd is not formed initially, all of the products containing milk are subject to shelf stability concerns relating to separation. In addition, products are always subject to concerns regarding desirable taste and mouthfeel. Taste is a significant problem, but it is more subjective and open to different evaluations by consumers having a variety of different likes and dislikes. Mouthfeel is critical as well, but generally somewhat less subjective than taste. The present inventions provide stable products that are believed to have especially good stability, desirable taste and desirable mouthfeel. As such, the preferred products advance the technology available to the industry for providing healthful beverage products to consumers seeking high quality milk and fruit beverages to enhance their lives.

Although milk products containing fruit flavors are known, many commercial products have only 5-10% of milk in them. These products may also include added stabilizers and emulsifiers. Many of these products have a chalky feel in the consumer's mouth and do not provide a significant amount of milk in any case.

There have been a number of processes for preparing milk/juice drinks having an acid pH. These methods usually incorporate soured or fermented milk having a pH believed to be in the neighborhood of about 4. For example, U.S. Pat. No. 3,625,702 to Exler discloses the preparation of sour milk drinks which are naturally or synthetically soured. A mixture of pectin and sugar is stirred into the soured milk and the temperature is adjusted to a temperature above 50 degrees centigrade and the mixture is homogenized and pasteurized. Others have removed components of the milk and juice to produce products they indicate to be stable. For instance, in U.S. Pat. No. 4,676,988, milk and juice are subjected to cation and anion exchange and then homogenized and optionally pasteurized or sterilized and/or carbonated to prepare a juice drink containing some milk. In U.S. Pat. Nos. 3,764,710 and 4,061,792, milk/juice beverages are formed by removing pectic substances and tannins from fruits or fruit extracts. U.S. Pat. No. 5,648,112 to Yang, et al. disclose the use of stabilizers and processing steps to stabilize a beverage containing milk and a food acid, preferably fruit juices. The patent discloses the use of high sheer mixing instead of homogenization to reduce particle size to about 0.8 microns. Stabilizers include a variety of gums including pectin and carboxymethyl cellulose (CMC).

Takahata (U.S. Pat. No. 4,212,893) discloses the use of locust bean gum and pectin to stabilize whole milk before adding fruit juice or other organic acids. Stirring is required before the beverage is homogenized and sterilized. The use of whole milk is disclosed and the disclosure indicates that the locust bean gum coats the milk fat solids to prevent aggregation.

Nishiyama (U.S. Pat. No. 4,078,092) discloses the use of carboxymethyl cellulose (CMC) to form a stable, uncoagulated milk/apple juice drink.

Dulebohn (U.S. Pat. No. 6,171,633) discloses a milk-based drink containing milk, fruit or vegetable juice, gum-based stabilizers and a composition containing an amino acid, an organic acid or inorganic acid, and a metal ion having a pH from 3.0 to 7.0.

While there has been significant interest in producing such products, most have been unsuccessful in achieving incorporation of a large amount of milk in a stable milk and fruit beverage product that has desirable flavor and mouthfeel and suitable stability for delivery to the consumer in a common retail market delivery environment typical in the United States and other Western countries.

It is desirable, therefore, to provide a stable milk product which contains fruit purees, and which contains a significant percentage of real milk. It is further desirable to have such a milk product that consists of all natural ingredients. It is also desirable to have a milk product, which does not have a chalky mouthfeel when tasted by a consumer.

SUMMARY OF THE INVENTION

The present invention provides a number of stable milk and fruit products, which preferably include a significant percentage of milk, fruit purees and fruit juices and other ingredients, preferably all-natural food ingredients. In preferred embodiments, the stable milk product will include from about 0.25 to about 8.0% by weight of an edible protein, preferably casein; about 0.01 to about 2.5% by weight of a positively charged electrolyte or a combination thereof, preferably a cation such as calcium, magnesium or the like; about 0.1 to about 40% by weight of a fully constituted fruit puree; about 0.01% to about 5% by weight of a stabilizer/emulsifier, preferably pectin which is preferably used in a range of from about 0.6 to about 2.5% by weight, preferably from about 1% of a pectin; and water; all in an at least primarily aqueous system where the pH is in the range of about 3.2 to about 4.6, preferably from about 3.8 to about 4.4. In preferred embodiments, the stabilized milk product contains from about 0.25 to about 8.0% by weight of milk protein, including solid milk protein particles in place of the edible protein, and the fully constituted fruit puree is fruit ingredients, including solid fruit particles. In such embodiments, the solid milk protein particles and the solid fruit particles are preferably suspended in the stabilized milk product and preferably remain suspended for a period of greater than six weeks after production, more preferably about six months after production. In preferred embodiments, the average particle size of the solid milk protein particles range from about 1.38 to about 11.0 micrometers and the average particle size of the solid fruit particles ranges from about 88 to about 249 micrometers. The present invention also includes a process for making a stabilized milk product. This process includes the steps of: blending a food milk product with a pectin stabilizer in a weight ratio of fluid milk to pectin stabilizer of from about 80 to 1 to about 20 to 1 to form a blended milk/pectin mixture; heating and homogenizing the milk/pectin mixture, wherein the temperature of the mixture is raised to a temperature of at least 150° F.; blending the homogenized milk/pectin mixture with fruit ingredients; and heating and homogenizing the blended milk/pectin/fruit mixture, wherein the temperature is raised to a temperature of at least about 170° F. The final product is then cooled and packaged. Preferred stabilized milk products of this kind preferably include from about 0.25 to about 8.0% by weight of milk protein including solid milk protein particles; from about 5 to about 40% by weight of fruit ingredients, including solid fruit particles; from about 0.01 to about 2.5% by weight of cations; from about 0.01 to about 5.0% by weight of a stabilizer, preferably pectin; and water; wherein the stabilized milk product is an aqueous fluid having a pH in the range of from about 3.2 to about 4.6, in which the solid milk protein particles and the solid fruit particles are suspended in the stabilized milk product and remain suspended for a period of greater than six weeks after production; and wherein the average particle size of the solid milk protein particles range from about 1.38 to about 11.0 micrometers and the average size of the solid fruit particles ranges from about 88 to about 249 micrometers. The present invention also includes a stabilized milk product made by the aforementioned process. The present invention further provides a milk product, which preferably does not have a chalky feel or taste when tasted by a consumer. The present invention still further provides a process for making the milk products of the present invention.

It is an object of the invention to provide a stabilized milk product containing both fruit and milk components that provide a homogenous, smooth product that remains stable for long periods of time so that the products are always desirable when they interface with the consumer. These products have been developed to give exceptional flavor, texture, and appearance in a shelf stable product that does not give any indication of precipitate or of particles that have fallen out of suspension during either processing or subsequent storage at either refrigeration or room temperature. It is the intent to provide a product which maintains stability under normal distribution and storage conditions.

The above-described features and advantages, along with various other advantages and features of novelty, are pointed out with particularity in the claims of the present application. For a better understanding of the present invention, however, its advantages and objects obtained by its use, reference should be made to the drawings and the accompanying descriptive matter, which form a further part hereof and in which there are illustrated and described preferred embodiments of the present invention.

DETAILED DESCRIPTION OF THE INVENTION

Figure 1:
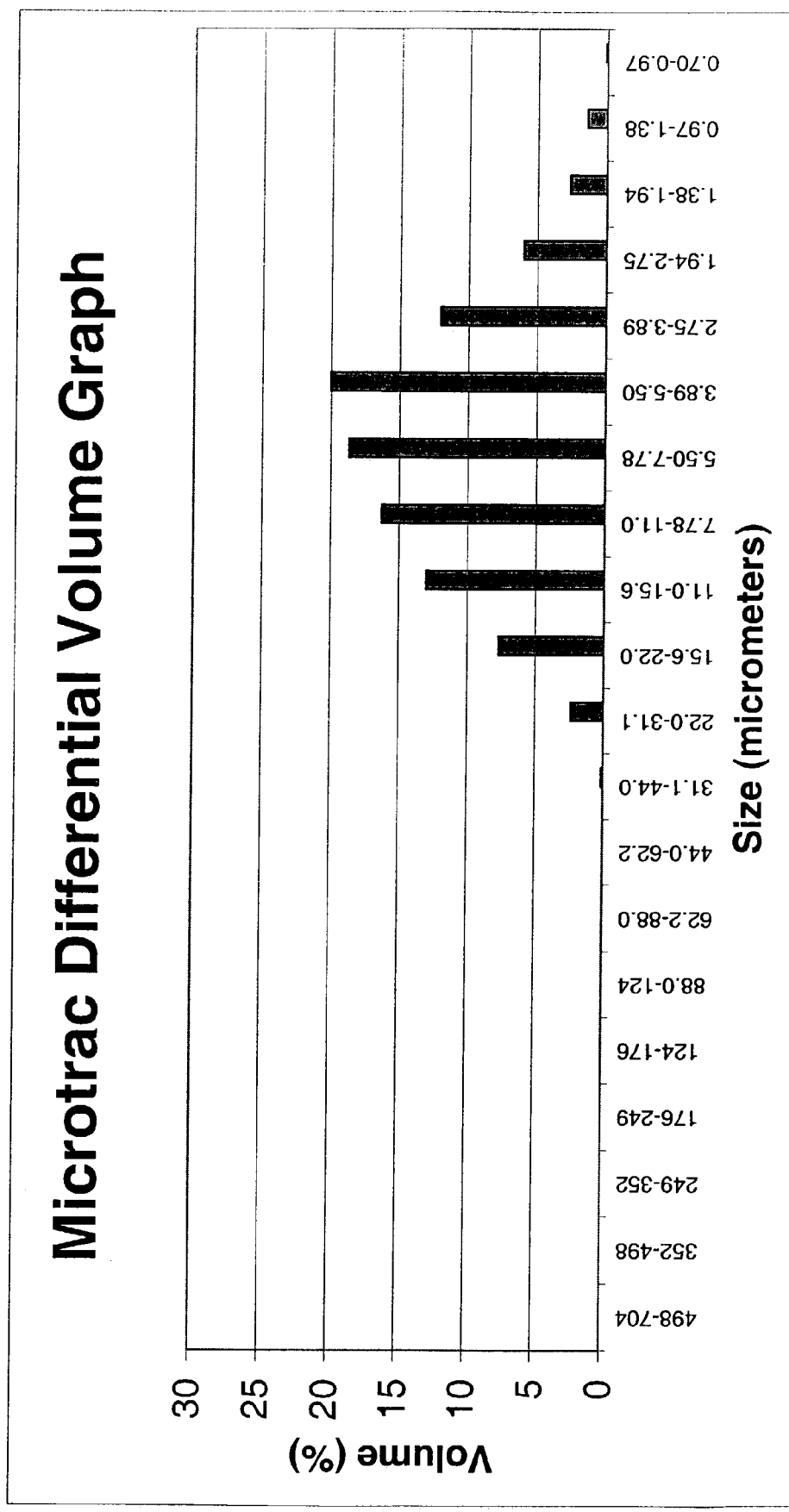
FIG. 1 is a bar graph displaying the differential channel data for the skim milk/pectin milk mixture described in Example 11.

There is provided, according to the principles of the present invention, a beverage product, preferably a milk product which preferably includes milk, an emulsifier or stabilizer such as pectin, water, fruit ingredients, and, optionally, an acidulant, preferably an organic acid, and, optionally, natural fruit flavors. The milk product of the present invention preferably includes from about 10% milk to about 90% milk. A preferred range of milk content is from about 38 to about 60%. In a preferred embodiment, the milk product of the present invention includes from about 38 to about 42% milk, preferably about 40% milk. In alternate embodiments, milk can be added in any form, including a non-fat dried milk, but fully constituted non-fat, or skim milk is preferred. In further alternate products, soy milk or dried soy milk isolates, or other edible protein rich fluids, concentrates or dry isolates may be used. The fruit ingredients of the milk product of the present invention may include fruit puree, fruit juice concentrate, or a fruit product of the type described in U.S. Pat. Nos. 5,879,737 and 5,849,350, each of which is incorporated herein by reference, in their entirety. Combinations of such fruit ingredients may also be employed. The fruit ingredients may further include fresh fruits, fruit purees, fruit juices, frozen purees, fruit puree concentrates, or fruit juice concentrates. The milk products of the present invention are stable even at a low pH, from about 3.2 to about 6.5, preferably from about 3.8 to about 4.4, more preferably from about 4.0 to about 4.25, thus, allowing them to fall under the acidified foods definition for processing. This low pH is achieved by the incorporation of natural acids in the fruit ingredients and alternately through the addition of acceptable food grade acidulants as, for example, citric acid and the like. Although the product of the present invention may be made to a low pH, products of the present invention may also be made having pH greater than 4.2. Furthermore, non-acidified products may be made according to the principles of the present invention.

The milk products of the present invention include pectin, or other suitable emulsifier or stabilizer, added in addition to any naturally occurring pectin in the fruit ingredients. It is believed that the added pectin and the pectin naturally occurring in the fruit ingredient, along with presence of electrolytes in the aqueous system, act as a natural stabilizer for the milk proteins, preventing the milk proteins from precipitating either during the heating steps described more completely below or as a result of the low pH. The calcium or other electrolytes in the milk are believed to give a stronger bridge between the pectin molecules, resulting in a stable matrix or "colloidal mass" complex, increasing stability of the products.

There is also provided, according to the principles of the present invention, a unique process of mixing or homogenizing in the proper sequence and at high temperature.

The compositions of the present invention, made in accordance with the process of the present invention, result in a milk product which prevents the chalky mouth-feel that is occasionally present in certain fruit juice/milk combination products.

As used herein, percentages refer to the percent of a component, on a percentage by weight basis, in the total composition, unless otherwise stated. The milk used in the products of the present invention can be skim milk, 2% fat-content milk and/or a whole milk. Alternately, reconstituted dried or powdered milk may be used. In preferred embodiments, the milk is skim milk.

In preferred embodiments, the pectin used is of a specific type made from citrus peel and is composed of high methoxyl pectin or HM pectin. Pectin of this type may be purchased from Danisco Cultor USA, Inc., New Century, Kans. (GRINDSTED™ Pectin, AMD 780, minimum 68% esterification), or from SKW Biosystems, Inc., Atlanta, Ga. (UNIPECTINE® AYD 28, degree of esterification: 68-74%). This pectin is preferably used in a range of about 0.1 to about 5.0% by weight of the final product, preferably in a range of from about 1.5 to about 3% based on the weight of the milk content, with the preferred amount being about 2.5% by weight of milk content. Thus, pectin is preferably used in an amount of from about 0.60% pectin to about 1.2% pectin in the final formulation, with the most preferred range being from about 0.8 to about 1.2, preferably from about 0.9 to about 1.1, most preferably about 1.0%.

In alternate embodiments, any other food grade emulsifier, hydrocolloid or stabilizer, which will effectively stabilize the aqueous colloidal matrix believed to exist, can be used either alone or in combination with others. Such emulsifier/hydrocolloid/stabilizers include: apple pectins; citrus pectins; gelatins from various sources; gelatin hydrolyzates; polysaccharides and leguminous seeds or seed extracts containing galactomannanes or the like; carob flour; plant extracts such as caoutchouc, gum arabic, gum ghatti, guar gum, locust bean gum, and the like; seaweed extracts from red algae such as agar-agar, carrageenan, furcellaran or from brown algae such as alginate; starch and starch derivatives such as amylopectin and amylose, potato, rice and corn starch and the like; semi-synthetic cellulose derivatives such as cellulose alkyl ether, sodium carboxymethyl cellulose (CMC) and the like; fermented polysaccharides from microbiological growth sources, e.g., xanthan and the like; protein precipitates from animal or plant origins such as gelatin caseinate co-precipitates and the like; and other food grade emulsifiers, hydrocolloids and stabilizers which provide suitable functionality needed to stabilize the other constituents, primarily proteins in an electrolyte, preferably calcium containing aqueous system.

The process of the present invention may include homogenization. However, in place of homogenization equipment, high or low speed sheering equipment may be used, or a sonolator may be used. In a preferred embodiment, the mixing process, homogenization pressure and temperature are controlled as follows. First, the pectin component and the milk component are mixed. This pectin/milk mixture is then heated to a homogenization temperature of about 175° F., then homogenized immediately at 2500 psi. Next, the fruit ingredients are blended with this homogenized pectin/milk mixture and that final mixture is heated to 195° F. and immediately homogenized at 2500 psi before it is filled into bottles. In other embodiments, the homogenization temperature may range from about 150° F. and above, and the homogenization pressure may range from about 1000 to about 4000 psi. In still another embodiment, the milk and the pectin may be mixed in a step that parallels the mixing of the fruit ingredients. These two mixtures may then be combined in a final mixing step.

Other ingredients may be added to the formulations of the present invention, including, Whey Protein Isolate, Non-Fat Dried Milk, and Carrageenan. Additionally, formulations for Chocolate based fruit drinks, using cocoa in the milk/pectin mixture may be made according to the principles of the present invention. Also, natural or artificial sweeteners, sugars, or corn syrups may be added. Vegetable purees or vegetable juices may also be included in the compositions of the present invention. Other added ingredients may include vitamins, minerals, medicinal compositions, soy and soy-related products.

In the following examples, pectin was blended into cold milk which was generally at refrigeration temperature. The pectin is an HM (high methoxyl) pectin or high ester pectin (GRINDSTED™ Pectin, AMD 780) purchased from Danisco Cultor USA, Inc., New Century, Kans. The milk/pectin mixture was blended with intense agitation in a blender. The mixture was then heated to a temperature of 165° F., except that the milk/pectin mixture in Example 11 was heat to 175° F. In preferred embodiments, the mixture is heat to a temperature ranging from about 150 to about 200° F., preferably from about 160° F. to about 175° F., more preferably to about 165° F. The mixture is then homogenized hot at about 2,500 psi in a Niro Soavi two-stage homogenizer (Model No. NS2006L). In each of the following examples, this milk/pectin mixture is then blended with the remaining ingredients with agitation, then heated to 195° F. and homogenized hot immediately at about 2,500 psi in the same homogenizer and filled in sanitary containers. In preferred embodiments, the temperature to which the milk/pectin/fruit ingredients mixture is raised ranges from about 160 to about 200° F., preferably about 180 to about 200° F., most preferably to about 195° F. The containers into which the hot stabilized milk products or beverages are placed, preferably bottles, are immediately capped and placed in ice water to bring the temperature down as quickly as possible. These product containers are eventually stored at refrigerator temperatures, preferably about 36° F. These products can alternatively be stored at room temperatures for an extended period of time without spoiling or separating, preferably at least six weeks, more preferably at least three months, and most preferably about six months.

Following is a brief summary of the process, followed by ingredient summaries by percent by weight for each different product:

Preferred Process For Making Milk Products of the Present Invention

1. Blend pectin into cold milk with intense agitation.
2. Heat milk/pectin to 165° F. (74° C.), homogenize hot at 2500 psi. A master mix may be made of the milk/pectin and used to make a variety of flavors.
3. Blend remaining ingredients, add to milk/pectin portion with agitation.
4. Heat to 195° F. (91° C.), homogenize hot immediately at 2500 psi, fill immediately after homogenization.
5. Cool bottles immediately in ice water to bring temperature down quickly.

EXAMPLE 1

Mango Milk Beverage (Final pH = 4.20)

| Ingredient | Percent |
|---|---|
| Skim Milk | 39.735 |
| Water | 39.00 |
| White Grape Juice Conc. | 10.54 |
| Mango Puree | 5.39 |
| Apple puree | 3.60 |
| Pectin | 1.02 |
| Apple Juice Concentrate | 0.48 |
| Citric Acid-Dry | 0.13 |
| Mango Flavor | 0.10 |
| Beta Carotene-Dry | 0.005 |
| | 100.00% |

EXAMPLE 2

Banana Milk Beverage (Final pH = 4.13)

| Ingredient | Percent |
|---|---|
| Skim Milk | 37.0475 |
| Water | 34.73 |
| White Grape Juice Conc. | 12.50 |
| Banana Puree | 8.00 |
| Apple Puree | 4.60 |
| Apple Juice Concentrate | 1.80 |
| Pectin | 0.95 |
| Banana Flavor | 0.22 |
| Citric Acid-Dry | 0.15 |
| Beta Carotene-Dry | 0.0025 |
| | 100.00% |

EXAMPLE 3

Peach Milk Beverage (Final pH = 4.00)

| Ingredient | Percent |
|---|---|
| Skim Milk | 37.625 |
| Water | 33.60 |
| White Grape Juice Conc. | 14.00 |
| Peach Puree | 8.00 |
| Apple Puree | 3.50 |

-continued

Peach Milk Beverage (Final pH = 4.00)

| Ingredient | Percent |
|---|---|
| Apple Juice Concentrate | 1.60 |
| Pectin | 0.965 |
| Peach Flavor 1 | 0.25 |
| Peach Flavor 2 | 0.25 |
| Citric Acid-Dry | 0.132 |
| Red Beet Powder | 0.075 |
| Beta Carotene-Dry | 0.0025 |
| | 100.00% |

EXAMPLE 4

Cherry Vanilla Milk Beverage (Final pH = 4.20)

| Ingredient | Percent |
|---|---|
| Skim Milk | 40.12 |
| Water | 38.15 |
| White Grape Juice Conc. | 9.80 |
| Cherry Juice Concentrate | 5.25 |
| Apple Puree | 4.00 |
| Apple Juice Concentrate | 1.20 |
| Pectin | 1.03 |
| Red Fruit Extract | 0.25 |
| Citric Acid-dry | 0.125 |
| Sweet Cherry Flavor | 0.040 |
| Vanilla | 0.035 |
| total | 100.00% |

EXAMPLE 5

Strawberry Milk Beverage (Final pH = 4.10)

| Ingredient | Percent |
|---|---|
| Skim Milk | 38.50 |
| Water | 36.18 |
| White Grape Juice Conc. | 13.00 |
| Strawberry Puree | 6.00 |
| Apple Puree | 3.43 |
| Apple Juice Concentrate | 1.62 |
| Pectin | 0.988 |
| Citric Acid-Dry | 0.132 |
| Strawberry Flavor | 0.10 |
| Red Fruit Extract | 0.05 |
| total | 100.00% |

EXAMPLE 6

Mixed Berry Milk Beverage (Final pH = 4.08)

| Ingredient | Percent |
|---|---|
| Skim Milk | 38.15 |
| Water | 37.10 |

-continued

Mixed Berry Milk Beverage (Final pH = 4.08)

| Ingredient | Percent |
| --- | --- |
| White Grape Juice Conc. | 12.18 |
| Apple Puree | 3.70 |
| Strawberry Puree | 2.70 |
| Raspberry Puree | 2.07 |
| Blueberry Puree | 1.59 |
| Apple Juice Concentrate | 1.20 |
| Pectin | 0.98 |
| Citric Acid-Dry | 0.132 |
| Red Fruit Extract | 0.10 |
| Mixed Berry Flavor | 0.05 |
| Grape Skin Extract | 0.05 |
| total | 100.00% |

EXAMPLE 7

Chocolate Banana Milk Beverage (Final pH = 4.13)

| Ingredient | Percent |
| --- | --- |
| Skim Milk | 36.23 |
| Water | 34.73 |
| White Grape Juice Conc. | 12.50 |
| Banana Puree | 8.00 |
| Apple Puree | 4.60 |
| Apple Juice Concentrate | 1.80 |
| Pectin | 0.95 |
| Cocoa | 0.82 |
| Banana Flavor-Comax2665C1133 | 0.22 |
| Citric Acid-Dry | 0.15 |
| total | 100.00% |

EXAMPLE 8

Chocolate Cherry Vanilla Milk Beverage (Final pH = 4.20)

| Ingredient | Percent |
| --- | --- |
| Skim Milk | 39.54 |
| Water | 38.10 |
| White Grape Juice Conc. | 9.80 |
| Cherry Juice Concentrate | 5.25 |
| Apple Puree | 4.00 |
| Apple Juice Concentrate | 1.20 |
| Pectin | 1.03 |
| Cocoa | 0.88 |
| Citric Acid-dry | 0.125 |
| Sweet Cherry Flavor | 0.040 |
| Vanilla-Virginia Dare 4X | 0.035 |
| total | 100.00% |

EXAMPLE 9

Orange Milk Beverage (Final pH = 4.11)

| Ingredient | Percent |
| --- | --- |
| Skim Milk | 40.70 |
| Water | 39.00 |
| White Grape Juice Conc. | 11.00 |
| Apple Puree | 4.14 |
| Orange Juice Conc. | 3.46 |
| Apple Juice Concentrate | 0.50 |
| Pectin | 1.02 |
| Citric Acid-Dry | 0.125 |
| Orange Flavor | 0.035 |
| Beta Carotene-Dry | 0.020 |
|  | 100.00% |

EXAMPLE 10

Milk/Pectin Mix made following the first two steps (second step at 175° F.):

| | |
| --- | --- |
| Skim Milk | 97.50%. |
| Pectin | 2.50%. |
|  | 100.00% |

Certain of these stabilized milk products (described in Examples 1-10) were studied to determine the size of the particles in the various products. The respective products were shipped by overnight air to Medallion Labs, Minneapolis, Minn. 55427, where each sample was analyzed using the MICROTRAC™ particle size analysis method. The testing was done on a standard range analyzer from Leeds & Northrup Microtrac, Model No. SRA 150. The Microtrac Analyzer consists of three components as described below.

The first component is the recirculating pump. A carrier liquid is added to the pump reservoir, and the sample is added to the carrier liquid via the pump reservoir. In the case of each of the samples provided, the carrier liquid which was used was deionized water. The second component is the optical bench. The optical bench consists of a number of components; the laser unit, a flow cell, through which the light from the laser is transmitted when the carrier liquid and the sample particles are pumped through the flow cell. The light from the laser is projected onto a detector array after it passes through the flow cell and the lenses and data from the detector array is transmitted to a microcomputer for analysis.

The raw data from the optical bench microcomputer is then transferred to the PC for formatting and reporting. The PC is set to control all of the functions that the optical bench performs, including laser alignment, detector array calibration and sample analysis. The PC program also allows the operator to control the data format and analysis parameters.

The data reported below for each of the respective samples includes the date on which the sample was made, the date on which the sample was shipped to the lab and the date on which the sample was tested. In each case, the samples were shipped in overnight air in a single package on Jan. 15, 2002 and received and studied on Jan. 16, 2002 and the report was generated on Jan. 17, 2002. The date when the sample was made and information regarding how the sample was made is reported with the data below in each instance.

Figure 2:
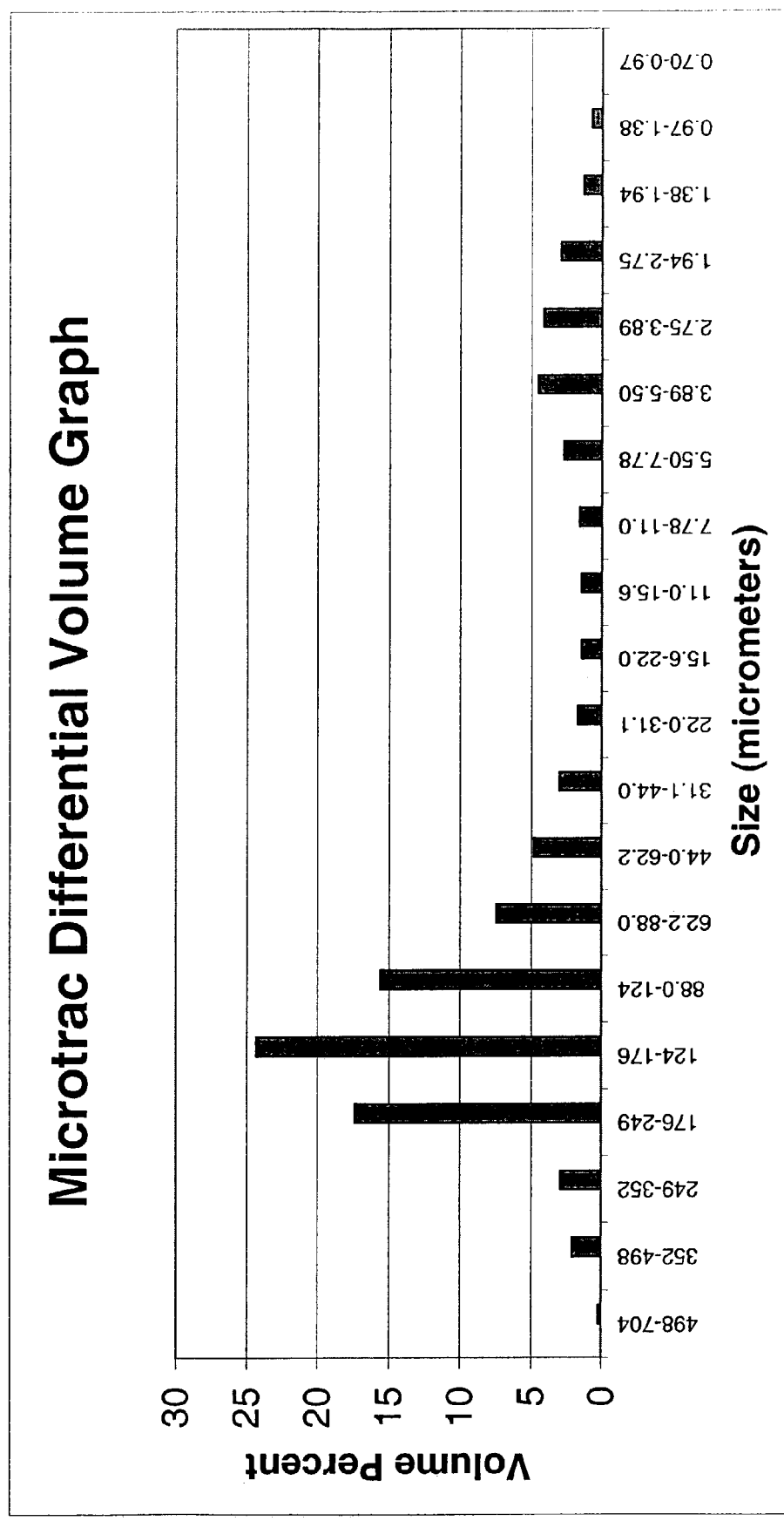
FIG. 2 is a bar graph displaying the differential channel data for the mango milk beverage product described in Example 12.
Figure 3:
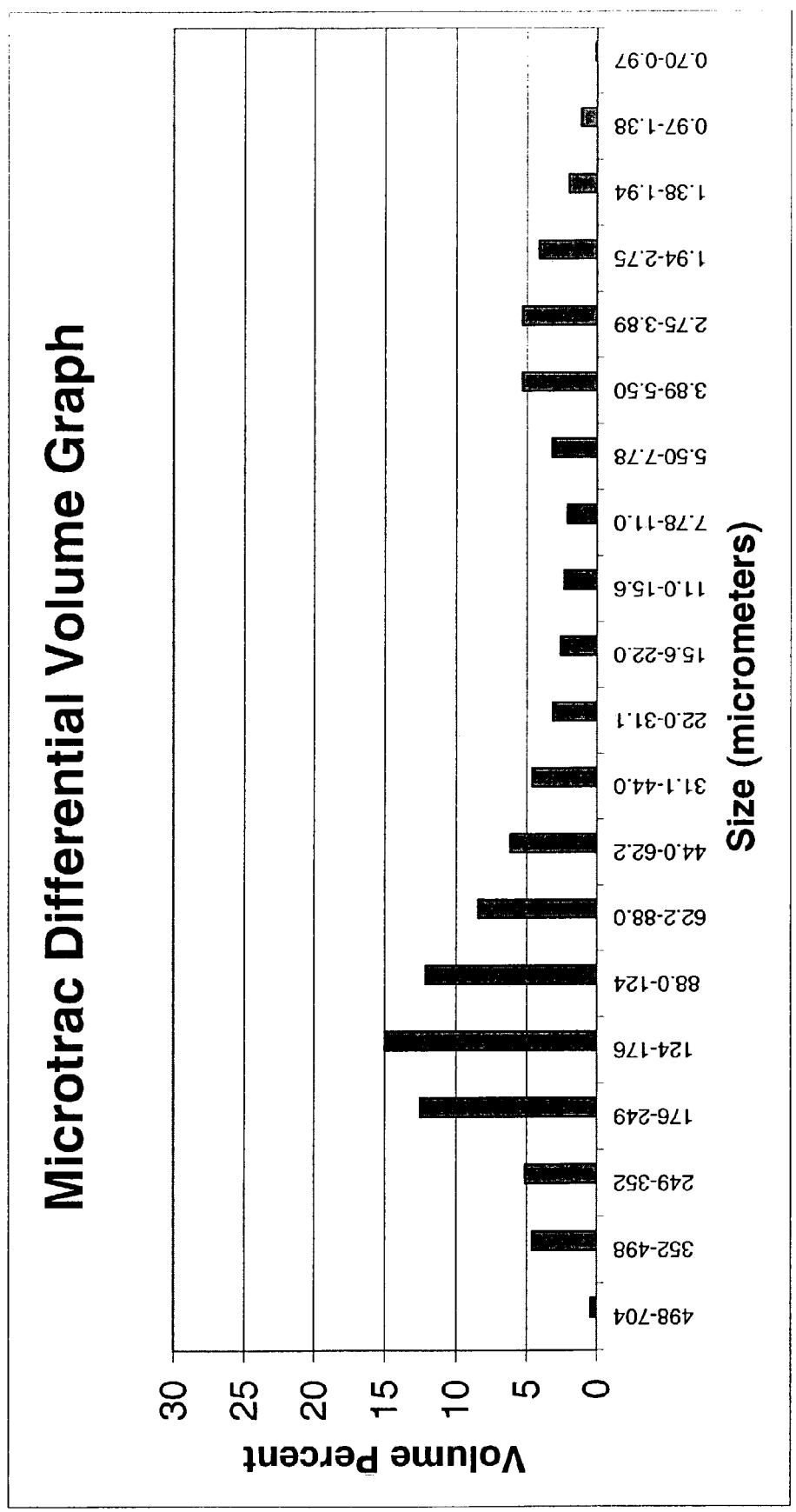
FIG. 3 is a bar graph displaying the differential channel data for the strawberry milk beverage product described in Example 13.
Figure 4:
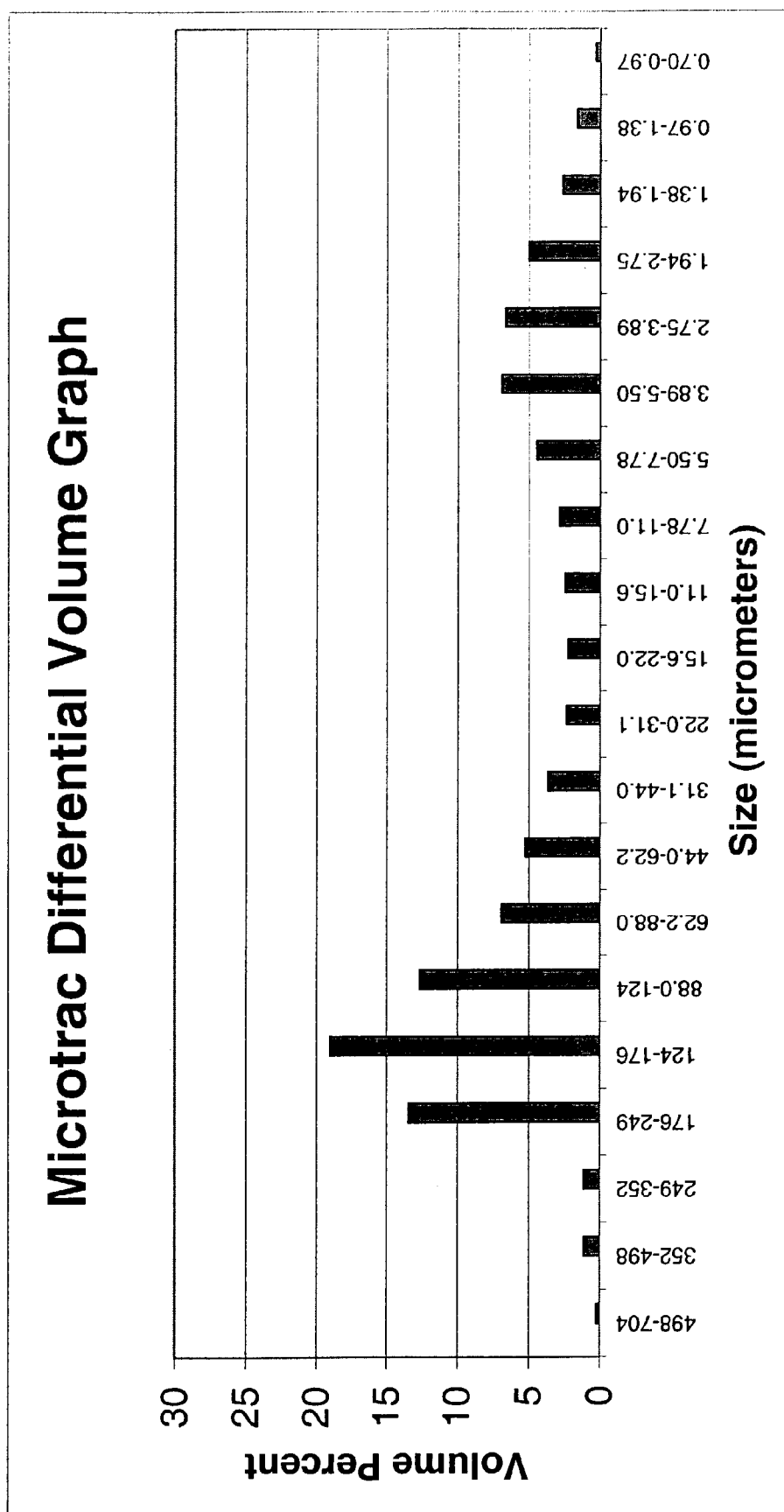
FIG. 4 is a bar graph displaying the differential channel data for the banana milk beverage product described in Example 14.
Figure 5:
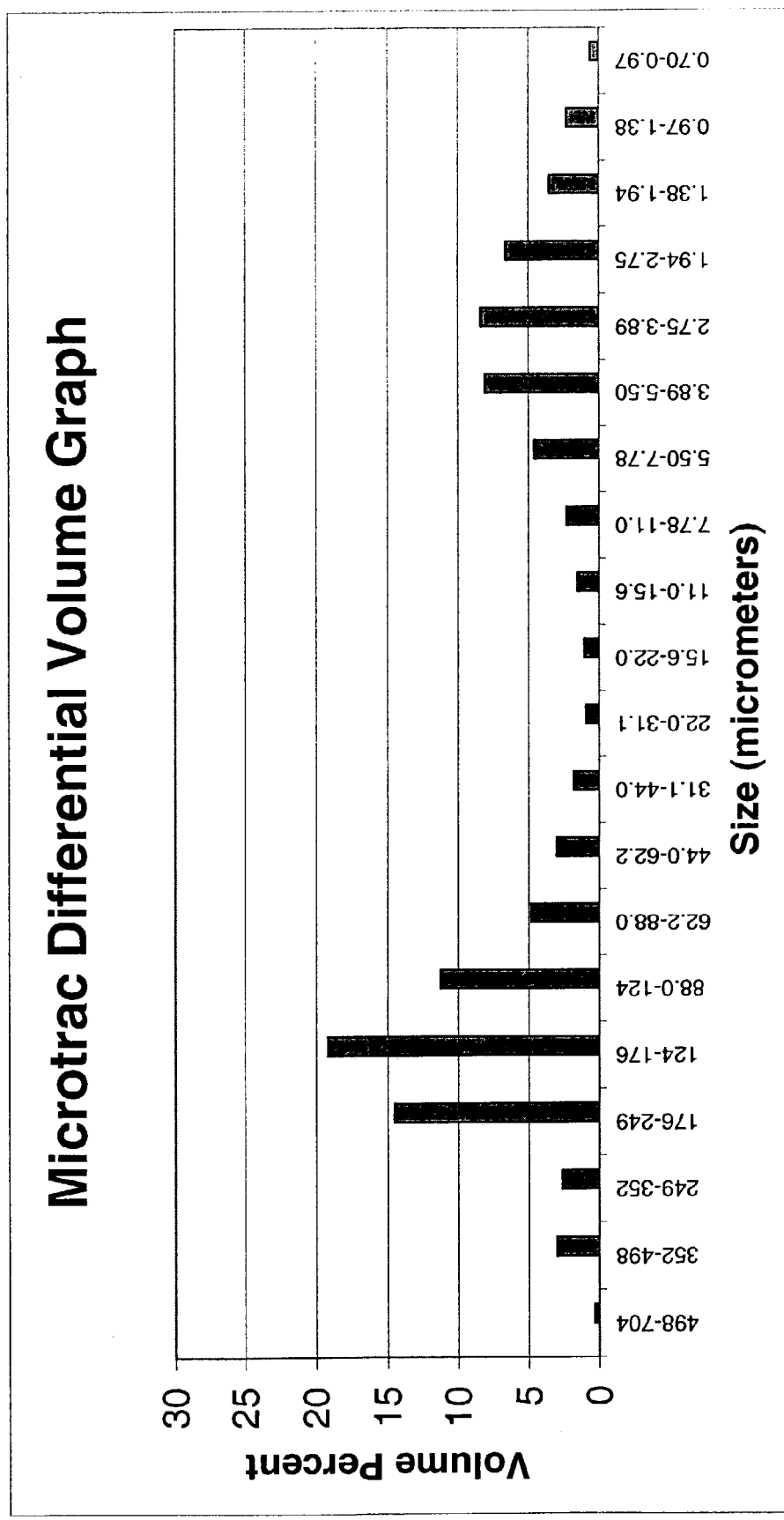
FIG. 5 is a bar graph displaying the differential channel data for the cherry vanilla milk beverage product described in Example 15.

Differential channel data is reported for each of the samples. This data reports the percentage of the sample by volume in each of 20 channels into which the Microtrac Analyzer divides the size distribution of particles in the sample. The numerical values are percents of the sample volume in each channel and the size ranges for each channel, reported in micrometers (or microns) is listed in the far left column. The Microtrac Analyzer is not a particle counter and cannot provide data on the population of particles in each channel range. The Microtrac Analyzer also generates a differential volume graph. These graphs are shown in FIGS. 1-5 for each of the five samples for which data was generated and is reported hereinbelow. The Figures show the channel data for Examples 11-15 in a graphic format. Summary data is also provided reporting information which is a convenient means of comparing the particle size profiles of two or more samples. There are five data values in this section: particle diameters in micrometers for the $10^{th}$, $50^{th}$ and $90^{th}$ percentiles of the particle size distribution for each of the samples. The value for the $10^{th}$ percentile means that 10% of the sample (by volume) has a diameter less than the stated value, and 90% of the sample has a diameter greater than the stated value for the $90^{th}$ percentile. The $50^{th}$ percentile value indicates a particle diameter for the median particle size. The mean value (MV) is the statistical mean of the particle size distribution. The units for this value are also in micrometers (or microns). The calculated specific surface area (CS) is based on the distribution profile. The units are meters$^2$/cubic centimeters of the sample.

EXAMPLE 11

| Skim milk/pectin made Jan. 15, 2002 as described in Example 10; cooled to 36° F.; then shipped | |
|---|---|
| Differential Channel Data | |
| Particle Diameter (micrometers) | Average |
| 498-704 | 0.0 |
| 352-498 | 0.0 |
| 249-352 | 0.0 |
| 176-249 | 0.0 |
| 124-176 | 0.0 |
| 88.0-124 | 0.0 |
| 62.2-88.0 | 0.0 |
| 44.0-62.2 | 0.0 |
| 31.1-44.0 | 0.1 |
| 22.0-31.1 | 2.3 |
| 15.6-22.0 | 7.7 |
| 11.0-15.6 | 13.0 |
| 7.78-11.0 | 16.2 |
| 5.50-7.78 | 18.6 |
| 3.89-5.50 | 20.0 |
| 2.75-3.89 | 12.0 |
| 1.94-2.75 | 6.0 |
| 1.38-1.94 | 2.6 |
| 0.97-1.38 | 1.4 |
| 0.70-0.97 | 0.1 |
| Summary Data | |
| Diameter | Average |
| 10% | 2.7 |
| 50% | 6.3 |
| 90% | 15.6 |

| Skim milk/pectin made Jan. 15, 2002 as described in Example 10; cooled to 36° F.; then shipped (continued) | |
|---|---|
| MV | 7.9 |
| CS | 1.173 |

EXAMPLE 12

| Mango Milk Beverage made Jan. 15, 2002 as described in Example 1; cooled to 36° F.; then shipped | |
|---|---|
| Differential Channel Data | |
| Particle Diameter (micrometers) | Average |
| 498-704 | 0.2 |
| 352-498 | 2.1 |
| 249-352 | 2.9 |
| 176-249 | 17.4 |
| 124-176 | 24.3 |
| 88.0-124 | 15.6 |
| 62.2-88.0 | 7.4 |
| 44.0-62.2 | 4.8 |
| 31.1-44.0 | 3.0 |
| 22.0-31.1 | 1.7 |
| 15.6-22.0 | 1.4 |
| 11.0-15.6 | 1.4 |
| 7.78-11.0 | 1.6 |
| 5.50-7.78 | 2.7 |
| 3.89-5.50 | 4.5 |
| 2.75-3.89 | 4.1 |
| 1.94-2.75 | 2.9 |
| 1.38-1.94 | 1.3 |
| 0.97-1.38 | 0.7 |
| 0.70-0.97 | 0.0 |
| Summary Data | |
| Diameter | Average |
| 10% | 4.2 |
| 50% | 118.1 |
| 90% | 219.5 |
| MV | 118 |
| CS | 0.381 |

EXAMPLE 13

| Strawberry Milk Beverage as described in Example 5 made Oct. 10, 2001 (stored at 36° F. until shipped) | |
|---|---|
| Differential Channel Data | |
| Particle Diameter (micrometers) | Average |
| 498-704 | 0.4 |
| 352-498 | 4.6 |
| 249-352 | 5.1 |
| 176-249 | 12.5 |
| 124-176 | 15.0 |
| 88.0-124 | 12.1 |
| 62.2-88.0 | 8.4 |
| 44.0-62.2 | 6.1 |
| 31.1-44.0 | 4.6 |
| 22.0-31.1 | 3.1 |

-continued

Strawberry Milk Beverage as described in Example 5
made Oct. 10, 2001 (stored at 36° F. until shipped)

| | |
|---|---|
| 15.6-22.0 | 2.6 |
| 11.0-15.6 | 2.3 |
| 7.78-11.0 | 2.1 |
| 5.50-7.78 | 3.2 |
| 3.89-5.50 | 5.3 |
| 2.75-3.89 | 5.3 |
| 1.94-2.75 | 4.1 |
| 1.38-1.94 | 2.0 |
| 0.97-1.38 | 1.1 |
| 0.70-0.97 | 0.1 |

Summary Data

| Diameter | Average |
|---|---|
| 10% | 3.3 |
| 50% | 87.2 |
| 90% | 249.3 |
| MV | 110.9 |
| CS | 0.519 |

EXAMPLE 14

Banana Milk Beverage as described in Example 2
made Oct. 10, 2001 (stored at 36° F. until shipped)

Differential Channel Data

| Particle Diameter (micrometers) | Average |
|---|---|
| 498-704 | 0.2 |
| 352-498 | 1.1 |
| 249-352 | 1.1 |
| 176-249 | 13.4 |
| 124-176 | 19.0 |
| 88.0-124 | 12.6 |
| 62.2-88.0 | 6.9 |
| 44.0-62.2 | 5.2 |
| 31.1-44.0 | 3.6 |
| 22.0-31.1 | 2.3 |
| 15.6-22.0 | 2.2 |
| 11.0-15.6 | 2.4 |
| 7.78-11.0 | 2.8 |
| 5.50-7.78 | 4.4 |
| 3.89-5.50 | 6.9 |
| 2.75-3.89 | 6.6 |
| 1.94-2.75 | 5.0 |
| 1.38-1.94 | 2.6 |
| 0.97-1.38 | 1.6 |
| 0.70-0.97 | 0.3 |

Summary Data

| Diameter | Average |
|---|---|
| 10% | 2.8 |
| 50% | 79.1 |
| 90% | 198.4 |
| MV | 89.9 |
| CS | 0.652 |

EXAMPLE 15

Cherry Vanilla Milk Beverage as described in Example 4
made Oct. 10, 2001 (stored at 36° F. until shipped)

Differential Channel Data

| Particle Diameter (micrometers) | Average |
|---|---|
| 498-704 | 0.3 |
| 352-498 | 3.0 |
| 249-352 | 2.6 |
| 176-249 | 14.5 |
| 124-176 | 19.1 |
| 88.0-124 | 11.2 |
| 62.2-88.0 | 4.8 |
| 44.0-62.2 | 3.0 |
| 31.1-44.0 | 1.8 |
| 22.0-31.1 | 0.9 |
| 15.6-22.0 | 1.0 |
| 11.0-15.6 | 1.5 |
| 7.78-11.0 | 2.3 |
| 5.50-7.78 | 4.6 |
| 3.89-5.50 | 8.1 |
| 2.75-3.89 | 8.4 |
| 1.94-2.75 | 6.6 |
| 1.38-1.94 | 3.5 |
| 0.97-1.38 | 2.3 |
| 0.70-0.97 | 0.6 |

Summary Data

| Diameter | Average |
|---|---|
| 10% | 2.4 |
| 50% | 90.9 |
| 90% | 219.1 |
| MV | 100.1 |
| CS | 0.815 |

The product of the present invention may be hot-filled into appropriate containers for later consumption. The product of the present invention may also be aseptically packaged, thus, providing an extended shelf-life product. Alternatively, the product of the present invention may be cold-filled, thus producing a stable product requiring refrigeration.

Milk drinks are products ready for consumption, made from milk with different fat contents and additions such as sugar, cocoa, fruit, flavors, and other food ingredients, which are mixed and contribute flavor, taste and texture.

These products have been developed to give exceptional flavor, texture, and appearance in a shelf stable product.

Following is a list of preferred parameters for the stable milk product of the present invention. These parameters outline preferred and optimally preferred ranges within which the present invention will be described. When used in this discussion, "%" means % by weight.

List of Parameters-Broad and Optimal:

A. Ingredients-Sources and Amounts In Prepared Shelf Stable Products.

1. Amount and Type of Milk: Milk products used could be any or all of the following: skim, 1%, 2%, whole, cream, reconstituted and recombined milk products and the like. Imitation milks or milk substitutes could also be used for the product including products containing milk protein, soy milks, rice milks and like products. Combinations of any of the aforementioned milk products and/or substitutes may also be used in the stabilized milk products of the present invention. These ingredients would preferably be used in a range of from about 5 to about 90%, preferably from about 10 to about 75%, more preferably from about 15 to about 60%, even more preferably from about 25 to about 50%, even more preferably from about 35 to about 45%, even more preferably from about 38 to about 42% and most preferably about 40% by weight.

2. Amount of Fat: Preferably the fat source for any fat that may be included in certain alternate embodiments would be butterfat, but could be fat from animal (most preferably Butterfat) or vegetable (preferably Canola, corn, soy, and the like) sources. These components are preferably used at levels of from about 0.01 to about 40%, and, more preferably, from about 0.1 to about 0.5% fat. The percentage would be limited at the higher level by viscosity and mouthfeel. In alternate embodiments fat replacements or fat substitutes can be used although these are not preferred. These fat replacements or substitutes may include modified starches, such as Maltrin 040 Maltodextrin (hydrolyzed corn starch, "Snow Flake" (enzymatically hydrolyzed potato starch) and the like; saccharose polyesters, e.g., "Olestra" or other long-chained fatty acid esters of saccharose or other sugars; fat substitute proteins such as "Simplesse 100", "Lacprodan 80" and the like.

3. Amount of Casein or Milk Protein: Source could be fresh milk, milk powder or protein, generally added in the range of from about 0.25 to about 8.0% by weight, but more preferably added at the range of from about 1.0 to about 2.5% for preferred beverages. In alternate embodiments, this component could be zero if the alternate product was made using soy milk, rice milk or the like and about 8% is preferably the upper limit. A higher amount would likely increase the viscosity above a suitable thickness for drinking. In alternate embodiments the casein can be replaced by protein from other sources such as soy, rice or the like. In such case, the protein may be added as a "milk", a concentrate or an isolate.

4. Amount and type of Fruit Ingredients: Fruit added to the formulation in the form of purees, juices, and/or concentrates in the total range of from about 5 to about 90%, more preferably in the range of from about 10 to about 60%, more preferably in a range of from about 15 to about 40%. More specifically, fruit purees are preferably added in the range of from about 0.1 to about 50% by weight, more preferably in the range of from about 4 to about 13%, most preferably, in specific reference to apple puree, from about 3.5 to about 4.5% by weight for preferred Milk beverages.

5. Amount of minerals/electrolytes: Major elements naturally present that are cations-calcium, sodium, potassium, and magnesium, in the ingredients or through separate addition to enhance nutritional profile function to stabilize the preferred milk beverage. These cations can be present in a broad range of from about 0.01 to about 2.50% by weight, but more preferably in the range of from about 0.40 to about 1.5% by weight. High limit on this parameter is generally flavor or chalkiness or sandy mouthfeel at higher levels.

6. Amount of Stabilizer/Emulsifier:
   Natural Gums-tree extrudates/extracts, seed or root, seaweed extracts, others such as pectin, gelatin, and starch, microbial fermentation gums (xanthan, dextran)
   Modified gums-Cellulose derivatives, starch derivatives, alginates,
   Synthetic chemical gums-polyvinylalcohol, etc.
   The ranges for all of these different stabilizers will be very different, but a broad range of from about 0.01% to about 5% by weight would cover most types, with the preferred range for the present milk beverage being completely dependent upon the type of stabilizer that is used; 1% for pectin, 3% for WPI, starch, etc. Some of these ingredients have a synergistic effect with each other and with some of the other ingredients in the formula such as di-potassium phosphate or calcium chloride.
   More preferred limits could be as little as 0.01 for some stabilizers that have high gelling capacity. Upper limits would be as high at 5%, maybe higher, with limiting factor being viscosity, products could be too thick to be desirable beverages.

7. Amount and type of acidulants: In preferred embodiment, acidulants can be added. Each different formulation for the different flavors contains both natural acids, plus added acid, usually in the form of citric, but we could use any food grade acid. The range that these ingredients are included are dependent upon concentration and initial pH of base ingredients, but the general range would be from about 0.01 to about 0.5% by weight, more preferably from about 0.10 to about 0.15% by weight.
   Other acidulants include: fumaric acid, citric acid, acetic acid, lactic acid and the like.

B. Physical Properties-Measurable Characteristics:

1. pH range: Currently product focuses on finished pH range of less than 4.6 to be considered an acidified food that does not require distribution and storage at refrigeration temperature. A different product has been developed with the same flavor profile at 6.0 pH, but would require refrigerated distribution and storage. In most cases the range for the final pH of these beverages would be from about 3.2 to about 6.5, more preferably from about 3.2 to about 4.6, even more preferably from about 3.8 to about 4.4 and even more preferably from about 4.0 to about 4.2 for the present stabilized acidified milk product.

2. Water Activity: to be listed as an acidified food, the water activity would have to be less than 0.85%. The Code of Federal Regulations (CFR) defines Water Activity as a measure of the free moisture in a product and is the quotient of the water vapor pressure of the substance divided by the vapor pressure of pure water at the same temperature. In preferred embodiments the water activity will be in a range of from about 0.85 to about 0.999, more preferably from about 0.98 to about 0.994.

3. Titratable acidity: TA is a measure of the total buffer capacity of a milk product. This will give different information than pH and can be useful in determining stability of a final product. The broad range for this property would be from about 0.5 to about 1.2, more preferably for the most preferred milk products, the range is from about 0.70 to about 0.85

4. Viscosity: In preferred embodiments, the viscosity of the preferred stabilized milk products will range from that of skim milk, about 2 mPa, to that of yogurt, about 3000 mPa, but more preferably from about 50 to about 350 mPa.

In an alternate process, used to manufacture alternate fruit/milk beverages, the formulations and processing parameters have been varied as discussed below to develop optimized products.

One of the unique properties that this product has is that we have incorporated a much greater percentage of milk into the finished product than is generally incorporated into other milk products containing fruit and fruit juices. Some other products on the market may have 5-10% real milk in them, with stabilizers and emulsifiers. This product will preferably have from at least 38% milk up to about 60% milk, most preferably about 40% real milk, preferably skim milk.

The preferred products are milk and fruit, all natural ingredients and the are shelf stable.

The preferred products are stable even at a low pH, from 4.0 to 4.25 allowing them to fall under the acidified foods definition for processing. This low pH is achieved by the natural acid in the fruit ingredients and through the addition of citric acid.

It is believed that one of the reasons the formulations are effective in producing stabile products is that the added pectin and the pectin naturally occurring in the fruit ingredients act as natural stabilizers for the milk or other proteins, preventing the proteins from precipitating during the heating steps. The calcium or other cations in the milk or other aqueous fluid also gives a stronger bridge between the pectin molecules, causing a sort of "colloidal mass" complex, increasing stability of the products. The unique process of homogenizing in the proper sequence and at high temperature is the probable reason for the pectin to interact and cause the stabilizing effect. This has not as yet been studied in depth, but it may be that the stabilizing effect is similar to the stabilizing effect apparent in the products and processes disclosed in U.S. Pat. Nos., the disclosures of which are incorporated herein by reference.

This pectin system, in combination with the processing sequence appears to have given us some control over the usually chalky mouthfeel that is present in most fruit juice/milk combination products. This may be due in part to the particle size distribution. The unique particle size distribution for each of the preferred products is also believed to enhance the stability of the preferred products. The average particle size of the particles believe to be solid milk protein particles generally fall in to a range of from about 0.97 to about 22.0, preferably about 1.38 to about 15.6, more preferably about 1.94 to about 11.0 micrometers or microns. The average particle size of the particles believe to be solid fruit particles generally fall in to a range of from about 31.1 to about 498, preferably about 44 to about 352, more preferably about 88 to about 249 micrometers. This disparity between the average sizes of the respective particle types is believe to enhance the stability of the preferred products.

Over the development of this product we have produced many different formulations that have included a large range in ingredients and processing parameters:

Milk percentage has ranged from 38-60%, with optimal being 40%. We have tried using skim, 2% Fat and Whole Milk, but typically use skim to keep products fat and cholesterol-free.

Pectin used is of a specific type, we have used samples from two different companies (product descriptions included with this report) The pectin is made from citrus peel and is composed of high methoxyl pectin. This pectin is used at a range of 1.50% to 3.0% in the milk, with the optimum being 2.5% in the skim milk portion. (This calculates out to a range of 0.60% pectin to 1.2% pectin in the final formulations with an optimum being 1.0%.) This is a higher percentage than recommended by the pectin suppliers for usual milk beverages. Another item is that we add this pectin to the product, but it already contains the pectin that occurs naturally in the fruit ingredients.

Preferable formulations are used for the fruit ingredient portion-these formulations are the same as the drinkable products.

Homogenization sequence, pressure, and temperature are all important factors in production of a stabilized product.

The pectin/milk mixture must be heated to 175° F., then homogenized immediately at 2500 psi. Then the fruit ingredients are blended with this homogenized pectin/milk mixture and that final mixture is heated to 195° F. and immediately homogenized at 2500 psi before it is filled into bottles.

We have tried other pressures, 1000-4000 psi, but the 2500 seems to give us the best viscosity and stabilization.

We try to minimize the time that the product remains at high temperatures to reduce the amount of cooked flavor and negative effect on the natural colors and flavors (particularly the red colors). We have been placing the final bottled product in an ice bath just after it is filled and capped.

Other ingredients may be used in the formulation to improve the stabilization, including Whey Protein Isolate, Non-Fat Dried Milk, and Carrageenan.

We also have formulations for Chocolate based fruit drinks, using cocoa in the milk/pectin mixture.

Thus, it is apparent that there has been provided, in accordance with the present invention, a novel improved milk product composition and method of manufacture. While the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and scope of the appended claims.

What is claimed is:

1. A process for making a stabilized milk product, the process comprising the steps of:
 a) blending a fluid milk product with a pectin stabilizer in a weight ratio of fluid milk to pectin stabilizer of from about 80 to 1 to about 20 to 1 to form a blended milk/pectin mixture;
 b) heating and homogenizing the milk/pectin mixture, wherein the temperature of the mixture is raised to a temperature of at least about 150° F.;
 c) blending the homogenized milk/pectin mixture with fruit ingredients; and
 d) heating and homogenizing the blended milk/pectin/fruit mixture, wherein the temperature is raised to a temperature of at least about 170° F.; wherein the process is effective to produce a stabilized milk product having:
  i) from about 0.25 to about 8.0% by weight of milk protein including solid milk protein particles;
  ii) from about 5 to about 40% by weight of fruit ingredients including solid fruit particles;
  iii) from about 0.01 to about 2.5% by weight of cations;
  iv) from about 0.01 to about 5.0% by weight of a stabilizer; and
  v) water; wherein the stabilized milk product is an aqueous fluid having a pH in a range from about 3.2 to about 4.6, in which the solid milk protein particles and the solid fruit particles are suspended in the stabilized milk product and remain suspended for a period of greater than six weeks after production; wherein the average particle size of the solid milk protein particles range from about 1.38 to about 11.0 micrometers and the average particle size of the solid fruit particles ranges from about 88 to about 249 micrometers.

2. A method of making a stabilized milk product, the method comprising:

blending a pectin into a milk fluid with agitation to form a mixture, the milk fluid containing solid milk protein particles;

heating the blend to a temperature of at least 150° F.;

homogenizing the heated mixture;

blending the mixture with a fruit ingredient containing solid fruit particles;

heating the blended pectin/milk/fruit mixture to a temperature of at least 180°. F.; and homogenizing the heated mixture; wherein the stabilized milk product is an aqueous fluid, having a pH in a range from 3.2 to 4.6, in which the solid milk protein particles and the solid fruit particles are suspended in the stabilized milk product and remain suspended for a period of greater than six weeks after production; wherein the average particle size of the solid milk protein particles range from about 1.38 to about 11.0 micrometers and the average particle size of the solid fruit particles ranges from about 88 to about 249 micrometers.

* * * * *